(12) United States Patent
Coleman et al.

(10) Patent No.: US 8,913,894 B2
(45) Date of Patent: *Dec. 16, 2014

(54) HIGH-BANDWIDTH OPTICAL COMMUNICATIONS RELAY ARCHITECTURE

(75) Inventors: Gary D. Coleman, Redondo Beach, CA (US); C. Thomas Hastings, Jr., Manhattan Beach, CA (US); Duane Smith, Rancho Palos Verdes, CA (US); John F. Silny, Playa Vista, CA (US)

(73) Assignee: Raytheon Company, Waltham, MA (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/549,191

(22) Filed: Jul. 13, 2012

(65) Prior Publication Data

US 2014/0016941 A1    Jan. 16, 2014

(51) Int. Cl.
    *H04B 10/00*    (2013.01)

(52) U.S. Cl.
    USPC ........... 398/121; 398/122; 398/124; 398/125; 398/126; 398/175; 398/118; 398/119; 455/12.1; 455/13.1; 455/427; 455/428; 370/316; 370/317; 370/318; 370/338

(58) Field of Classification Search
    CPC .. H04B 10/11; H04B 10/112; H04B 10/1121; H04B 10/1123; H04B 10/1125; H04B 10/1127; H04B 10/114; H04B 10/118
    USPC ......... 398/121, 131, 118, 119, 122, 123, 124, 398/125, 115, 135, 136, 128, 129, 130, 175, 398/173, 180; 455/12.1, 13.2, 427, 426, 455/428, 13.3, 13.1, 3.02, 430; 370/316, 370/317, 318, 310, 338, 326
    See application file for complete search history.

(56) References Cited

U.S. PATENT DOCUMENTS 5,439,190 A    8/1995    Horstein et al.
5,526,404 A    6/1996    Wiedeman et al.
(Continued)

FOREIGN PATENT DOCUMENTS

EP        1 130 809 A2    9/2001

OTHER PUBLICATIONS

Hadhazy, Adam; "How it works: NASA's Experimental Laser Communication System"; Popular Mechanics; http://www.popularmechanics.com/science/space/nasa/how-it-works-nasas-experimental-laser-communication-system; 2pp., 2011.

(Continued)

*Primary Examiner* — Hanh Phan
(74) *Attorney, Agent, or Firm* — Christie, Parker & Hale, LLP

(57) ABSTRACT

A free space optical communication system (100) and method including a constellation of several satellites (102). Each of satellites including: several inter-satellite optical telescopes (204) for optical communication with multiple neighboring satellites, each inter-satellite optical telescope is capable of adjusting its elevation angle; and several up/down link optical telescopes (206) for optical communication with multiple ground sites. As the constellation passes a given ground site, some of the up/down-link telescopes of a given satellite are configured to track at least two respective ground optical telescopes of the given ground site and send data to the ground optical telescope with the clearest line of sight to the given satellite. Moreover, each of the satellites includes optical circuitry (208, 210, 212, 216) for optically processing and switching incoming and outgoing optical signals without converting the optical signals into electrical signals.

27 Claims, 6 Drawing Sheets

(56) References Cited

U.S. PATENT DOCUMENTS

| | | | |
|---|---|---|---|
| 5,661,582 A * | 8/1997 | Kintis et al. | 398/121 |
| 5,710,652 A | 1/1998 | Bloom et al. | |
| 6,032,041 A * | 2/2000 | Wainfan et al. | 455/427 |
| 6,043,918 A | 3/2000 | Bozzay et al. | |
| 6,160,994 A | 12/2000 | Wiedeman | |
| 6,381,055 B1 * | 4/2002 | Javitt et al. | 398/131 |
| 6,545,787 B1 | 4/2003 | Lenormand et al. | |
| 6,912,075 B1 | 6/2005 | Ionov et al. | |
| 7,292,789 B1 | 11/2007 | Capots et al. | |
| 7,561,802 B2 * | 7/2009 | Krill et al. | 398/121 |
| 7,609,972 B2 * | 10/2009 | Cunningham et al. | 398/118 |
| 2002/0181059 A1 | 12/2002 | Christopher | |

OTHER PUBLICATIONS

Keller, John; "Optical links are key to next-generation military communications satellite"; Military & Aerospace Electronics; vol. 15; Issue 4; http://www.militaryaerospace.com/articles/print/volume-15/issue-4/departments/electro-optics-watch/optical-links-are-key-to-next-generation-military-communications-satellite.html; 2pp., 2014.

Steitz, David E. et al.; Contract Release: C12-107; NASA Awards Loral Contract for Laser Comm Payload Flight; Apr. 18, 2012; http://www.nasa.gov/home/hqnews/2012/apr/HQ_C12-107_NASA_LORAL.html; 2pp.

Arnon, Shlomi et al.; "Laser Satellite Communication Network—Vibration Effect and Possible Solutions"; Proceedings of the IEEE; vol. 85, No. 10; Oct. 1997; pp. 1646-1661.

Invitation to Pay Additional Fees and, Where Applicable, Protest Fee for corresponding International Patent Application No. PCT/US2013/040528, filed May 10, 2013, Invitation to Pay Additional Fees Mailed Mar. 12, 2014 (5 pages).

Written Opinion of the International Searching Authority for International Application No. PCT/US2013/040528 filed May 10, 2013, Written Opinion of the International Searching Authority mailed Jul. 14, 2014 (12 pgs.).

International Search Report for International Application No. PCT/US2013/040528 filed May 10, 2013, International Search Report dated Jul. 7, 2014 and mailed Jul. 14, 2014 (6 pgs.).

* cited by examiner

APT = Acquisition, Point, Track

HIGH-BANDWIDTH OPTICAL COMMUNICATIONS RELAY ARCHITECTURE

FIELD OF THE INVENTION

The present invention relates to a high-bandwidth optical communications relay architecture.

BACKGROUND

The use of the Internet worldwide is ever increasing with a high growth rate in the developing countries around the world. However, many emerging business centers in regions near the Equator are handicapped by poor connectivity to the Internet. These centers are typically located in countries with limited national high bandwidth network infrastructure, and sometimes surrounded by either hostile neighbors or inhospitable terrain that makes terrestrial and undersea cable connections impractical.

Nevertheless, there is a continuing demand for high bandwidth connectivity to the Internet in these countries. Many of the most rapidly growing markets are both near the Equator and poorly connected via undersea cables. For some of the larger countries, the internal network infrastructure is relatively primitive. Furthermore, natural disasters can also disrupt connections, and the ability to rapidly reconfigure a communication network to reconnect the affected areas can be extremely valuable. In addition to the underserved markets, the major global telecom carriers of significant and growing wholesale bandwidth have needs for backup and replacement bandwidth to maintain Quality of Service agreements.

Geostationary Earth Orbit (GEO) communication satellites have inherently high latency, while other satellite communication networks suffer from some combination of limited worldwide connectivity, low bandwidth, or cost. The GEO satellites offer coverage of a reasonably large fraction of the Earth per satellite but have long communication paths (~36,000 km) resulting in a signal latency of at least 120 msec per path. Moreover, multiple bounces may be required to provide routing, and connection between ground sites not within footprint of same satellite may require ground connections. Additionally, GEO communication satellites are currently restricted to Radio Frequency (RF) signals, which limit available bandwidth to a range of hundreds of MHz to a few GHz. Furthermore, multiple beams need to be used to provide relatively high total throughput per satellite (72 beams at 48 Mbps is typical, for 3.4 Gbps per satellite).

The "Other 3 Billion" (O3B) program is attempting to serve the same general equatorial region using Radio Frequency (RF) signals. As a result of RF usage, O3B has severe bandwidth restrictions. O3B uses a Medium Earth Orbit (MEO) constellation of 8 to 12 satellites in Equatorial orbit at 8,000 km. Each satellite will have up to 10 RF links that will (eventually) be capable of up to 1.2 Gbps per channel. The constellation is rated at 70 total ground sites at 1.2 Gbps per ground site, or 84 Gbps total, and the satellite network is divided into 7 regions, with a single gateway per region. O3B also has no inter-satellite links, so communicating across regional boundaries requires multiple bounces.

The Iridium™ constellation simply doesn't have the bandwidth to address the same market. Iridium's™ Low Earth Orbit (LEO) constellation has an altitude of about 780 km, which limits access per satellite. Accordingly, a constellation of 66 active satellites is used to provide 24/7 coverage of the entire world. Use of L-band in LEO constellation limits the bandwidth of satellite phones to less than 1 Mbps. Gateway links offer 10 Mbps of bandwidth to a few selected locations. Moreover, inter-satellite links are RF, with substantially limited bandwidth.

Some limited experiments were conducted for free-space optical communication (FSO), also sometimes referred to as laser communication, or lasercom for short, by the National Aeronautics and Space Administration (NASA) around 2005, in the NASA Mars Telecommunication Orbiter program. However, these experiments proved to have limited coverage duration, limited connectivity, and usually limited bandwidth of about 5-10 Gbps of upper limit per link. No commercial viability was the conclusion of the program.

Several attempts have been made to establish a space-based laser communication network. One such network was the Transformational Communication Architecture (TCA), which was designed around a backbone of GEO satellites with inter-satellite links, and laser links to other spacecrafts and to airborne platforms and ground sites. The estimated cost of TCA was so high that it could not survive and was cancelled at its onset.

All prior attempts at lasercom in space have used an optical to electrical to optical (O-E-O) approach, with the incoming optical signal converted to an electrical signal and then converted back to an outgoing optical signal. The approach has the advantage that the signal can undergo a full re-amplification, re-shaping and re-timing (3R) regeneration on-board while it is in the electronic domain, but the size, weight, and especially power of the hardware has been a severe challenge. Much of the work has also concentrated on using satellites in GEO, for which the range is as much as 6 times further than the MEO satellites.

SUMMARY

In some embodiments, the present invention is a free space optical communication system which includes a constellation of several satellites. Each of satellites includes: several inter-satellite optical telescopes for optical communication with multiple neighboring satellites, and each inter-satellite optical telescope is capable of adjusting its elevation angle to accommodate changes in the number of satellites in the constellation. Each of satellites further includes: several up/down link optical telescopes for optical communication with multiple ground sites, where each ground site has two or more ground optical telescopes. As the satellite constellation passes a given ground site, one or more of the up/down-link telescopes of a given satellite are configured to track at least two respective ground optical telescopes of the given ground site and send data to the ground optical telescope with the clearest line of sight to the given satellite. Moreover, each of the satellites includes optical circuitry for optically processing and switching incoming and outgoing optical signals without converting the optical signals into electrical signals.

In some embodiments, the present invention is a method for free space optical communication in a constellation of a plurality of satellites. The method include: using a plurality of inter-satellite optical telescopes in each of the plurality of satellites to optically communicate with multiple neighboring satellites; using a plurality of up/down link optical telescopes in each of the plurality of satellites to optically communicate with multiple ground sites, each ground site having two or more ground optical telescopes; and tracking, by a given satellite, at least two respective ground optical telescopes of a given ground site and sending data to a ground optical telescope with the clearest line of sight to the given satellite, wherein each of the plurality of satellites optically processes and switches incoming and outgoing optical signals, without converting the optical signals into electrical signals.

In some embodiments, the present invention is a free space optical communication system which includes a constellation of several satellites. Each of satellites includes: several inter-satellite optical telescopes for optical communication with multiple neighboring satellites, and several up/down link optical telescopes for optical communication with multiple ground sites. Each of the plurality of satellites includes optical circuitry for optically processing and switching incoming and outgoing optical signals without converting the optical signals into electrical signals.

In some embodiments, each inter-satellite optical telescope may utilize circular polarization or spectral diversity to provide dual optical signal paths. Furthermore, the one or more of the up/down-link telescopes of a given satellite may be configured to continuously and in real time track at least two respective ground optical telescopes of the given ground site, for example, by using an optical beacon. In some embodiments, a single up/down-link telescope of the given satellite may be configured to track said at least two respective ground optical telescopes of the given ground site using circular polarization or spectral diversity.

In some embodiments, each inter-satellite optical telescope may include beam steering mirrors to compensate for jitter and orbit differences of said each inter-satellite optical telescope. In some embodiments, each up/down link optical telescope may include dual internal steering mirrors to maintain track on said at least two respective ground optical telescopes of the given ground site.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention is directed to a high-bandwidth transparent optical communication relay architecture that provides a novel approach for offering many of the world's most rapidly growing business centers a dramatically improved throughput of communication signals, including improved connectivity to the Internet. The space optical hardware is designed to be as agnostic as possible about future evolution of optical communication standards, so it doesn't become obsolete over time. The ground hardware can be upgraded incrementally to support higher bandwidths or any changes in the standards. The network is highly flexible, with multiple redundant paths and rapid reconfiguration.

In some embodiments, the present invention is directed to a novel approach (e.g., a constellation of MEO satellites) to satisfy the need for an optical relay on a space platform that is capable of linking a redundantly connected ring of MEO satellites to a network of ground sites. This constellation of MEO satellites can do so transparently and independent of the optical format and modulation scheme, and preferably the signal is within the C-band or L-band spectral bands, with possible expansion to other optical communication bands. Using communication standards, some embodiments are capable of providing a total throughput (counting both directions of each link) of at least 800 Gbps to ground sites, with the ability to pass at least 1,600 Gbps of data to and from neighboring satellites. The payload is configured to support growth of the constellation, with new satellites launched to easily add capacity, and the payload can rapidly reconfigure the network to drop any failed satellite out of the network.

Figure 1:
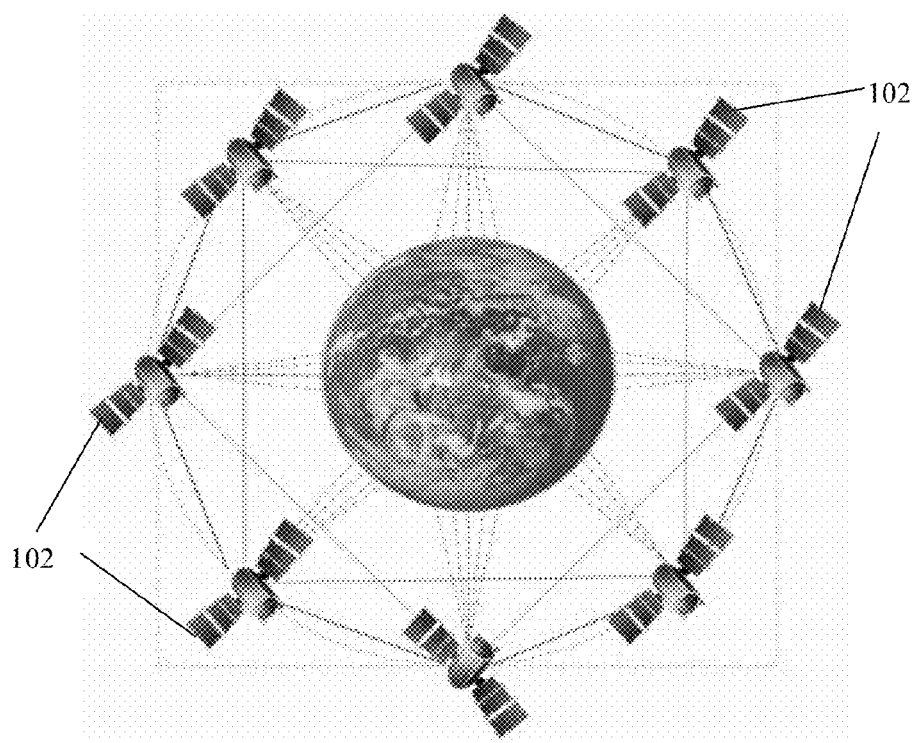
FIG. 1 shows an exemplary MEO constellation of a plurality of satellites with optical communication, according to some embodiments of the present invention.

FIG. 1 shows an exemplary MEO constellation 100 of a plurality of satellites 102, according to some embodiments of the present invention. As shown, eight satellites 102 (8-ball constellation) are arranged and networked together to provide a continuous coverage of a band of the earth, especially around the equatorial orbits. Although, eight satellites are shown as an example, the present invention is not limited to eight satellites and a different number of satellites, for example, four, sixteen or other number of satellites can be used for more coverage time per satellite and/or redundancy purposes. Each satellite of the MEO constellation is optically coupled to multiple nearest neighbors (for example, 4 or more, except in the minimal 4-ball constellation, where only 2 neighbors are visible) using inter-satellite lasercom (ISL) optical telescopes. In some embodiments, circular polarization or spectral diversity is used to provide dual optical signal paths per telescope. In some embodiments, circular polarization is used to separate transmitted signals from received signals.

Different spectral regions can also be used to allow four or more paths per ISL optical telescope, with minimal impact on the complexity of the network channel assignment. The ISL optical telescopes are capable of adjusting their elevation angle to allow (accommodate) a different angle of optical communication to accommodate adding or removing satellites (i.e., changes in the number of the satellites in the constellation) from the ring (constellation) and re-phasing the satellites that are currently in use.

For example, in the case of a new satellite being launched into the constellation, one or more commands for modifying the trajectory and reconfiguring the inter-satellite and ground optical communications (telescopes) are sent, for example, from a ground telescope in a ground site to each satellite.

In some embodiments, each satellite is connected to multiple ground sites using up/down-link optical telescopes. The minimum possible configuration is a single up/down-link telescope per satellite, however, multiple telescopes increase the overall capacity of the network and would provide a larger revenue stream. The host satellite can easily support at least four up/down-link telescopes, although six or eight telescopes may be preferable in some embodiments. Connections are scheduled so that at least one up/down-link telescope is free whenever the ground connection from a preceding satellite in the constellation is nearing an end, allowing the network to establish a new connection before breaking the old one, that is, a "Make-Before-Break" scheme.

Site diversity on the ground is used to mitigate weather outages, with multiple (two or more) terminals (ground optical telescopes) in relatively close proximity to each other, for example, within a few hundred kilometers of the associated ground gateway. Two of these ground terminals/telescopes are selected for each pass of an optically connected satellite to the ground site, based on predicted cloud-free line of sight probability for the pass. These two ground terminals may be tracked by separate up/down-link telescopes on the satellite, but it would also be possible to utilize a dual-tracking system with a field of view large enough to cover both ground terminals simultaneously by a single telescope. In some embodiments, dual polarization is used as one approach to distinguishing between the signals from the two ground terminals when spatial separation is inadequate. In some embodiments, different spectral bands can be used for the beacons.

In addition, each ground site would have at least two up/down-link telescopes so that new connections can be established before the old one is broken, as the satellite constellation passes the ground site. This way, the satellite constellation has a high availability by using site diversity, with monitoring and real-time switching between separate ground terminals supporting a single gateway/site. During a pass, the up/down-link telescopes continuously and in real time track both current ground sites/terminals, using an optical beacon, and send data to the one with the clearest line of sight. The multiple (e.g., two or more) ground terminals in relatively close proximity to each other are in direct communication with a shared gateway via wired or wireless, electrical or optical communication schemes. The gateway may be located in a carrier hotel or other site with multiple connections to local high speed Internet networks.

In some embodiments, each of the ground terminals includes a telescope and antenna system for steering the optical beams at the one or more of the satellites. In some embodiments, ground-based gimbaled lasercom terminals/telescopes track individual satellites during each pass. In some embodiments, a network operations center sends up one or more switching commands to configure the data paths to maintain continuous connectivity between desired ground sites, with extra links used to make new connections before the old ones are dropped as the satellites orbit around the earth.

Although the satellite constellation of FIG. 1 is described with respect to a MEO orbit, a combination of GEO and MEO orbit satellites are also possible and are within the scope of the present invention. The addition of one or more GEO satellites to the architecture may be done in multiple ways. In a simple, but limited approach, the gateways for the MEO relay constellation would be co-located with terminals for the GEO satellites. This approach uses the MEO constellation to pass data from one GEO satellite to another. A more flexible approach can add one or more GEO-link telescopes to each MEO satellite, with a field of regard that is large enough that at least one MEO satellite will always be able to communicate with any satellite in GEO orbit. Given the increased range, the amplifiers designed to close the MEO links would be capable of supporting 3-5 Gbps going to and from GEO. Higher data rates can be achieved with increased power output from the amplifiers. Because the hardware operates in a transparent mode, there is no need to make any significant changes to support this different data rate and range. In some embodiments, it is also be possible to add or switch to an RF communication mode for uplink and downlink to GEO satellites, using a conformal electronically steered array (ESA). In some embodiments, because the RF signals are only be used to communicate from one satellite to the other, the frequency allocation issues are simplified and the utilized frequency can be selected as one that does not penetrate the atmosphere.

In some embodiments, a combination of Low Earth Orbit (LEO) and MEO orbit satellites are also possible and are also within the scope of the present invention. There are also multiple ways to add one or more LEO satellites to the constellation of the present invention. In every case, the focus is on one-directional data flow, from LEO satellites collecting data at relatively high data rates to a gateway connected to the ground processing center for the satellites. A simple approach is to add a compatible lasercom transmitter to the LEO satellite. The up/down-link beam directors onboard the relay satellites are capable of tracking the LEO satellite, when it is within about 20 degrees of the equator. For sun-synchronous or nearly polar satellites, this would provide two communication windows per orbit, each representing roughly 10% of the orbital period of the satellite. The connection time would increase for lower inclination LEO orbits. A store-and-dump strategy using an on-board data storage unit may be used.

A somewhat more complicated approach would add a ring of LEO satellites in the same orbit plane to the constellation of the present invention. Each LEO satellite has a pair of inter-satellite links communicating with its nearest neighbors, and an uplink lasercom transmitter to the MEO ring. The LEO satellites would receive data from the satellite preceding it in orbit, add its own data, and then transmit the result to the following satellite. When the data stream reaches one of the two satellites in the LEO ring that is connected to the MEO ring, the data is then sent up to the MEO satellite and relayed to a desired gateway within the normal MEO coverage zone. This approach results in all LEO satellite data reaching the ground with a latency of less than a second. It would also reduce or eliminate the need for onboard data storage units for the LEO satellites. A mixed approach is also possible, in which a partial LEO ring is established to increase the available connect time. As long as any of the satellites in the partial ring is able to contact a MEO relay satellite, the data from all of the satellites reach the gateway in a fraction of a second.

Figure 2:
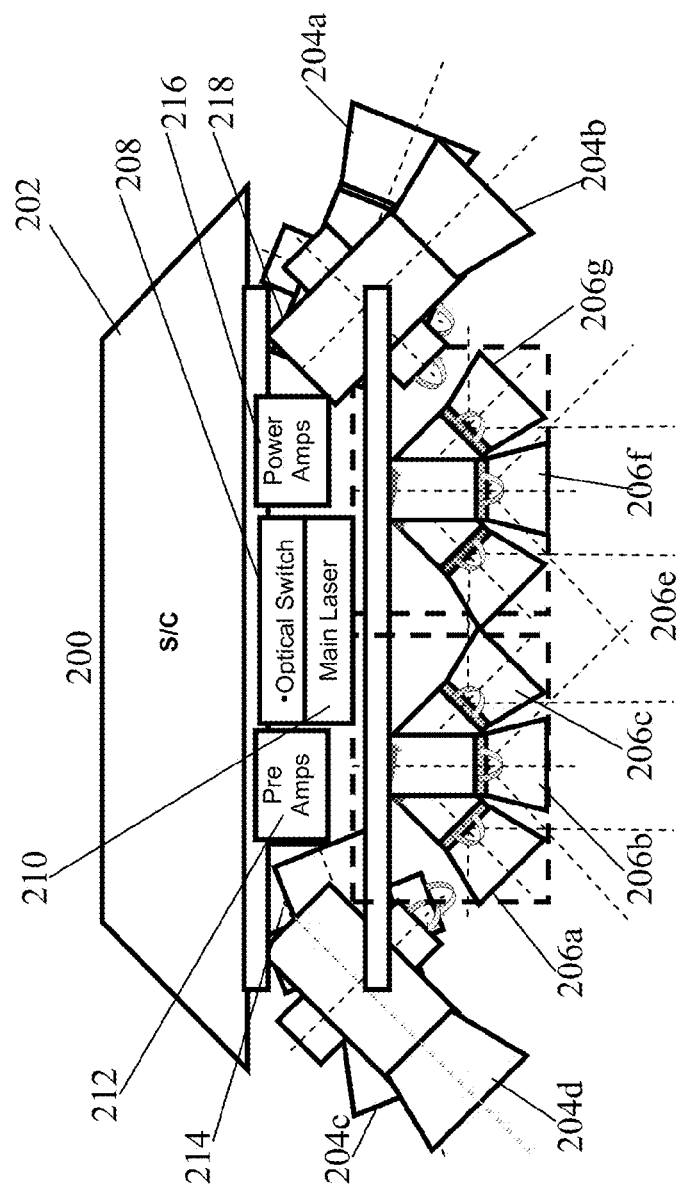
FIG. 2 is an exemplary layout view of a satellite payload including cross link and up/down telescopes, according to some embodiments of the present invention.

FIG. 2 is an exemplary layout view of a satellite payload 200 including cross link and up/down telescopes, according to some embodiments of the present invention. As shown, a plurality of inter-satellite (cross link) telescopes 204a to 204c (four shown in this exemplary figure) are installed on an exterior portion of each satellite for inter-satellite optical communications. In this example, telescopes 204a and 204b are located at the right side of the satellite and communicate with one or more of its nearest neighbor satellites on its right side. For example, 204a would point to and communicate with the nearest neighboring satellite (i.e., adjacent satellite) on that side and 204b would point to and communicate with the next nearest neighboring satellite (i.e., two satellites away) on that side. Similarly, telescopes 204c and 204d are located at the left side and communicate with one or more of its nearest neighbor satellites on its left side. Each of the cross link telescopes are capable of being selectively steered for calibrating the optical communication with the neighboring satellites, and/or in the case of a new satellite being added to the constellation, for establishing new optical communication with the new satellite. That is, the inter-satellite optical links connect the respective satellite in a redundant network.

In some embodiments, the cross link telescopes 204a to 204d include adjustable elevation settings to track the neighboring satellites in the constellation. In some embodiments, two nearest neighbors and two next-nearest neighbors are utilized for inter-satellite communications. Beam steering mirrors used to compensate for host satellite jitter and slight orbit differences. Elevation adjustment is used on an infrequent basis to add or drop satellites into the constellation and communication ring. Since the cross link telescopes are a shared resource, several methods are appropriate for using polarization and coarse wavelength separation to combine signals into a cross-link and then separate the data after transmission. In some embodiments, four or more signal bundles share the same cross-link telescope.

Additionally, there are a plurality of up/down link telescopes 206a to 206g (six shown in this exemplary figure) installed on the exterior portion of each satellite for ground communication and site diversity. In some embodiments, each up/down link telescope supports at least a single high-bandwidth (e.g., 100 Gbps) bi-directional connection between ground sites around the world. Another up/down link telescope either on the same satellite or a connected satellite is used for the other end of the connection. With eight satellites and six up/down-link telescopes per satellite, the network can support up to 24 of the high-bandwidth bi-direction connections.

In some embodiments, the up/down link telescopes 206a to 206g are gimbaled telescopes or telescopes with coelostats on each satellite to track a ground site and establish a high-bandwidth link. In some embodiments, Dense Wavelength Diversity Multiplexing (DWDM) is used to provide bi-directional 100 Gbps (or more) in bandwidth links with each ground site. Polarization and/or wavelength diversity is also used to isolate the two data streams. The site diversity is used to reduce outages due to clouds within the line of sight. Each telescope has dual internal steering mirrors to maintain track on two receive ground telescopes within a 100 km radius of a central point, which is tracked by the gimbal or coelostat. These two ground telescopes can be selected from a larger set before each satellite pass.

In some embodiments, the up/down link telescopes are small optical telescopes (for example, about 10 cm diameter aperture) either on gimbal or using a coelostat to track the ground sites. Multiple beam steering mirrors and control loops allow each up/down link telescope to simultaneously track two terminals within a 100 km radius of the ground site, which may be selected on each pass from a larger list of available terminals. In some embodiments, the ground optical telescopes are larger, for example, nominally 40 cm diameter, which may eliminate coelostats as an option for steering the beams from these large telescopes. In some embodiments, the inter-satellite links are established by larger, for example, about 30 cm, telescopes that use a fast beam steering mirror to compensate for platform jitter and slight variations in orbit, with an elevation mechanism used to re-point along the orbit plane any time new satellites are added to the ring or failed satellites are removed from it. The cross link telescopes used for nearest neighbor connections may be smaller than those used for more distant next-nearest neighbors, to keep the rest of the hardware identical and reduce payload mass.

The optical on-board hardware (payload) of each satellite includes a plurality of optical pre-amplifiers 212, an optical switch matrix 208, one or more main amplifiers 210, a plurality of power amplifiers 216, a Command, Control, And Telemetry (CC&T) subsystem 214, and a power supply 218. In some embodiments, the optical pre-amplifiers 212 and power amplifiers 216 support a fixed number (for example, 10) of independent 10 Gbps channels with acceptable cross-talk and sufficient total amplification to provide acceptable signal-to-noise ratio (SNR) or photons per bit, at each receiver. In other embodiments, the laser pump power is scalable so that the number of channels per amplifier can be adjusted to accommodate different demands for bandwidth. The amplifiers may be Erbium-Doped Fiber Amplifiers (EDFAs), Planar Waveguides (PWGs), Raman amplifiers, Semi-Guiding High Aspect Ratio Core (SHARC) fiber laser amplifier, other technologies, or a combination thereof.

In some embodiments, commercial standards are used to the extent possible, with space qualification of commercial, off-the-shelf (COTS) parts, the desired approach to space hardware, and direct use of COTS parts on the ground. In some embodiments, C-band or C and L-band optical amplifiers use Planar Waveguide (PWG) or related technology. In some embodiments, International Telecommunication Union (ITU) standard 50 GHz channel separation for the payloads is used, with possible simple upgrades in future as the standards evolves and commercial hardware is developed to support it. In some embodiments, a power interface is configured to connect to a (standard) power bus of a satellite so that the optical hardware of the present invention can fit into a "standard" or pre-existing satellite platform with certain power limitations. In general, the satellite optical hardware is as transparent and agnostic as possible to specific implementation details, so that all such upgrades can be achieved on the ground.

Each of the plurality of satellites includes optical circuitry/hardware for optically processing and switching incoming and outgoing optical signals without converting the optical signals into electrical signals. The on-board hardware receives an incoming optical data stream from the ground and/or one or more neighboring satellites, optically regenerates it, uses optical switches to direct it to the desired (selected) output path, and sends it toward its final destination (ground and/or one or more neighboring satellites). Regeneration of the incoming optical data stream includes re-amplification (by the optical pre-amplifiers 212, the main amplifiers 210 and the power amplifiers 216), all in optical domain. That is, the amplification of the optical data stream is accomplished without ever converting to electrical signals within each satellite payload, and transparently to data modulation schemes. The on-board hardware is capable of operating in C-band, L-band and other optical bands, and reshaping and re-phasing the optical data stream.

In some embodiments, channel separation of about 50 GHz with Dense Wavelength Division Multiplexing (DWDM) is used to provide at least 80 10-GHz channels. However, more channels and higher bandwidth per channel (using more complicated modulation schemes) are possible and are within the scope of the present invention. The optical switch matrix 208 allows each optical input to be optically coupled to any other output channel. In some embodiments, the optical switch matrix 208 is capable of switching whatever signal it receives on each input, including entire bundles of channels. In some embodiments, de-multiplexing, switching at the individual channel level, and re-multiplexing are performed to allow switching each individual channel. The on-board optical switch matrix 208 also allows establishing and updating network optical paths as the satellite constellation passes over the ground sites.

One or more main lasers 210 are used on each satellite as part of the amplification chain for the optical signals on each satellite. In some embodiments, where the channels are all multiplexed together, the main amplifier may require as much power as the final power amplifiers. In other embodiments, in which each connection has its own amplifier chain, the main amplifiers require significantly less power than the final power amps.

Figure 3:
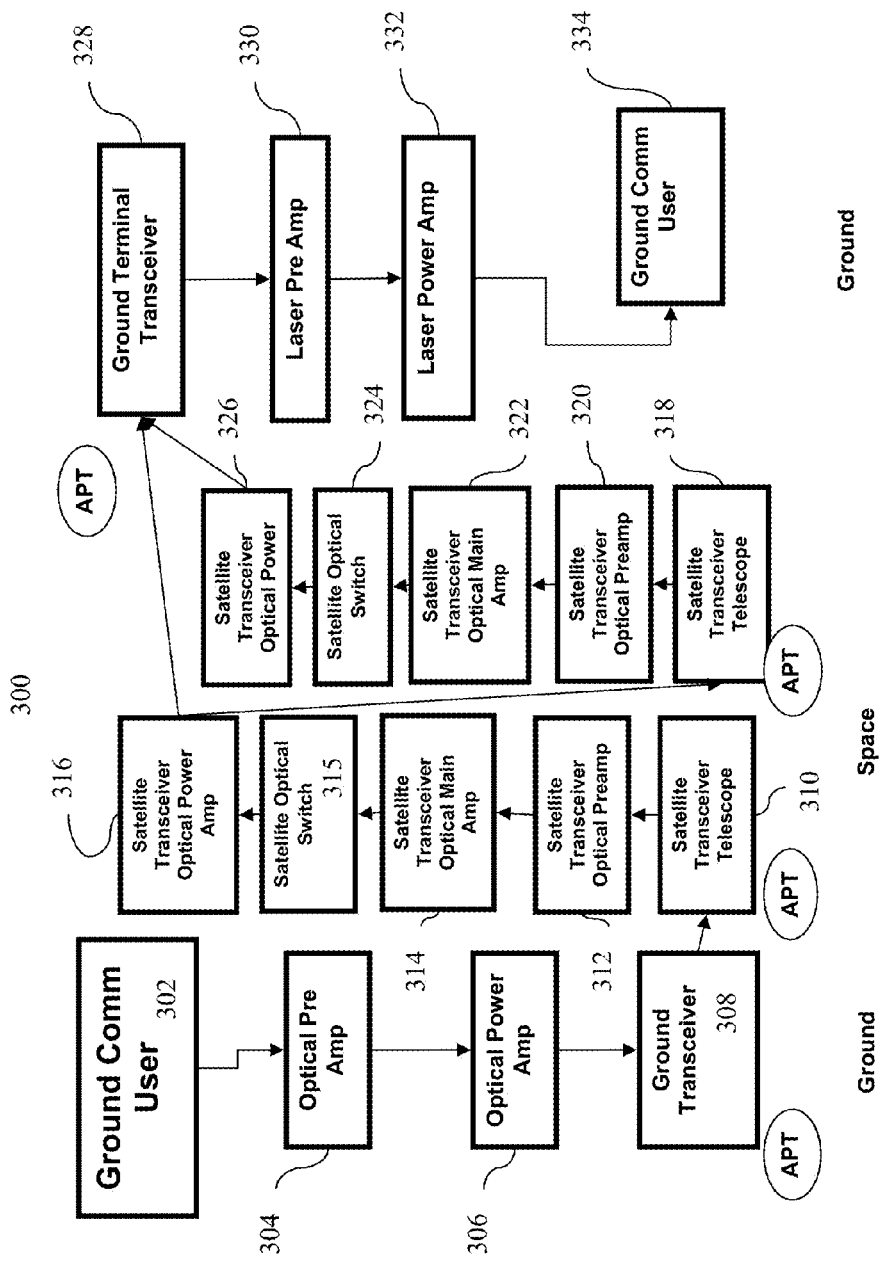
FIG. 3 is an exemplary block diagram of an optical communication path through a satellite payload, according to some embodiments of the present invention.

FIG. 3 is an exemplary block diagram of an optical communication channel 300, part of which travels through a payload of the satellite, according to some embodiments of the present invention. As shown, an optical signal is generated by a ground user in block 302. The generated optical signal is pre-amplified in block 304 and power amplified in block 306, before it is provided to a ground terminal optical transceiver 308. The ground terminal optical transceiver 308 uses one of the ground terminal telescopes to transmit the amplified optical signal to the selected satellite. The transmitted optical signal is received by the satellite transceiver telescope 310 and amplified by the satellite preamp 312 and main amp 314. The amplified optical signal is then directed to a desired location, for example, the ground terminal transceiver 328 or the neighboring satellite transceiver telescope 318, by the on-board optical switch 315. After the path has been selected, the optical signal is amplified one more time by the optical power amplifier 316 associated with the selected telescope.

The optical switch network may be in various forms, including a simple N×N cross-connect optical switch that is transparent to the optical signal content or a de-multiplexer followed by an 80×80 non-blocking cross-connect optical switch that allows distribution of the data stream from each origin to multiple destinations (targets). In some embodiments, the optical switch network may be placed immediately after the preamplifiers, to reduce the power handled by the switch. In some embodiments, the main amplifier and power amplifier may be combined into a single higher gain power amplifier.

When the optical signal is received by the neighboring satellite transceiver telescope 318, it is amplified (in the neighboring satellite transceiver) by optical preamplifier 320 and optical main amplifier 322. An on-board optical switch 324 (of the neighboring satellite) redirects the signal to the ground terminal transceiver 328, after it is amplified by the on-board optical power amplifier 326. The received optical signal is then amplified by an optical pre amplifier 330 and an optical power amplifier 332, before it is sent to the user 334 for further processing. In some embodiments, the ground transceivers 308 and 328 are at two different sites. The satellite transceiver telescope 310, the neighboring satellite transceiver telescope 318, and the ground transceivers (telescopes) 308 and 328 are capable of pointing to and tracking their target telescopes, as indicated by "APT" (Acquisition, Point, Track) designation, in FIG. 3. This optical communication channel architecture is also sometimes referred to as a bent pipe. As stated above, the optical signal is not converted to electrical signals, so it is as if the optical signals are simply traveling through a bent pipe that receives the signal and changes its direction to another ground station or satellite.

Figure 4:
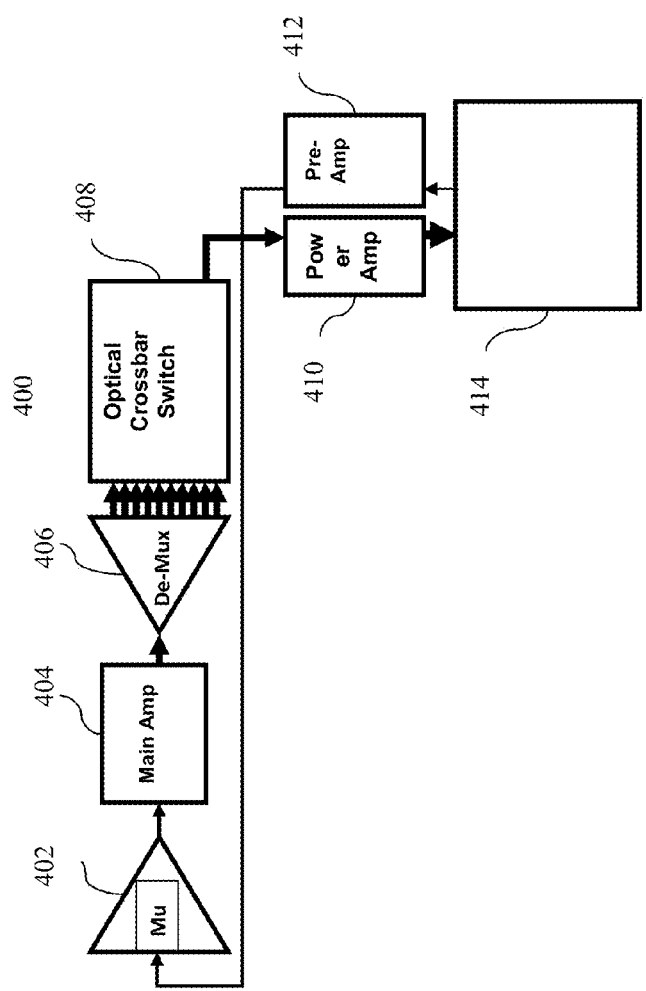
FIG. 4 is a simplified block diagram for an on-board optical hardware system, according to some embodiments of the present invention.

FIG. 4 is a simplified block diagram for an on-board optical hardware system 400, according to some embodiments of the present invention. This figure is simplified to illustrate only one destination from the optical switch 408. As shown, an incoming optical signal is received by an optical beam expander 414 and pre-amplified by an optical preamplifier 412. In some embodiments, each incoming bit in the incoming signal contains ~400 photons, based on the link budget. To achieve that same level at the next stage, either on the ground or on another satellite, the signal needs to be amplified by a factor of roughly 4 million. The pre-amplified optical signals may then be combined by a multiplexer. The combined signals for the individual channels are then amplified by an optical main amplifier 404 and de-multiplexed by De-Mux 406 and then fed to an optical (crossbar) switch 408 to be directed to a selected destination by the beam expander 414, after it is amplified by a final power amplifier 410. In some embodiments, the multiplexer and de-Mux can be eliminated because separate main amplifiers are used for each preamplifier.

The optical amplifiers are designed to be extremely low noise, so that photon shot noise is the dominant noise source. The optical amplifiers may include one or more optical filters to reduce any noise that may be included in the optical signal from a previous stage. Three amplification stages are regarded as optimal, with the preamp optimized for low noise, the final power amp optimized for wall-plug power efficiency (electrical to optical conversion efficiency), and the main amp balancing the two requirements. In some embodiments, the optical beam expanders are configured to use Dense Wavelength Diversity Multiplexing (DWDM) to provide bi-directional 100 Gbps (or more) in bandwidth links with each ground site.

In some embodiments, Planar Waveguide (PWG) lasers are used for all three types of the optical amplifiers, however, other options, for example, Erbium Doped Fiber Amplifier (EDFA) and Semi-Guiding High Aspect Ratio Core (SHARC) fiber laser amplifiers can also be used. An exemplary SHARC laser amplifier is disclosed in a co-owned U.S. Patent Application No. 2009/0041061, filed on Aug. 9, 2007, the entire contents of which is hereby expressly incorporated by reference. In some embodiments, the beam expander 414 is a 10-cm up/down beam expander with gimbal and fast steering mirror (FSM). In some embodiments, the optical preamplifier 412 is capable of amplifying the incoming signal by a factor of bout 4000× (gain) and output 1 mW per channel signals from 0.25 µW per channel input signals. In some embodiments, the optical main amplifier 404 has a gain of about 250× and is capable of taking 80 channels of about 0.4 mW per channel as input and output 80 channels at 100 mW per channel, or 8 W total. In other embodiments, there are multiple main amplifiers, each paired with a preamplifier and input to the N×N optical cross-bar switch, and capable of taking 10 input channels of about 0.4 mW per channel and outputting 10 channels of 100 mW per channel, or 1 W total. In some embodiments, the optical power amplifier 410 has a gain of about 25× and is capable of taking 10 channels of about 0.4 mW per channel as input and output 10 channels at 1 W per channel.

The optical (crossbar) switch is capable of performing different switching approaches, which allows a fully transparent point-to-point connections or a more flexible mesh connection between all of the ground sites. Each input can be connected to any output, without blocking the other inputs. In some embodiments, the optical switch uses Microelectromechanical systems (MEMS) technology, with multiple small mirrors tilting as commanded to reflect each optical signal from its input to the desired output. In some embodiments, a low-loss piezoelectric switch is used.

Figure 5:
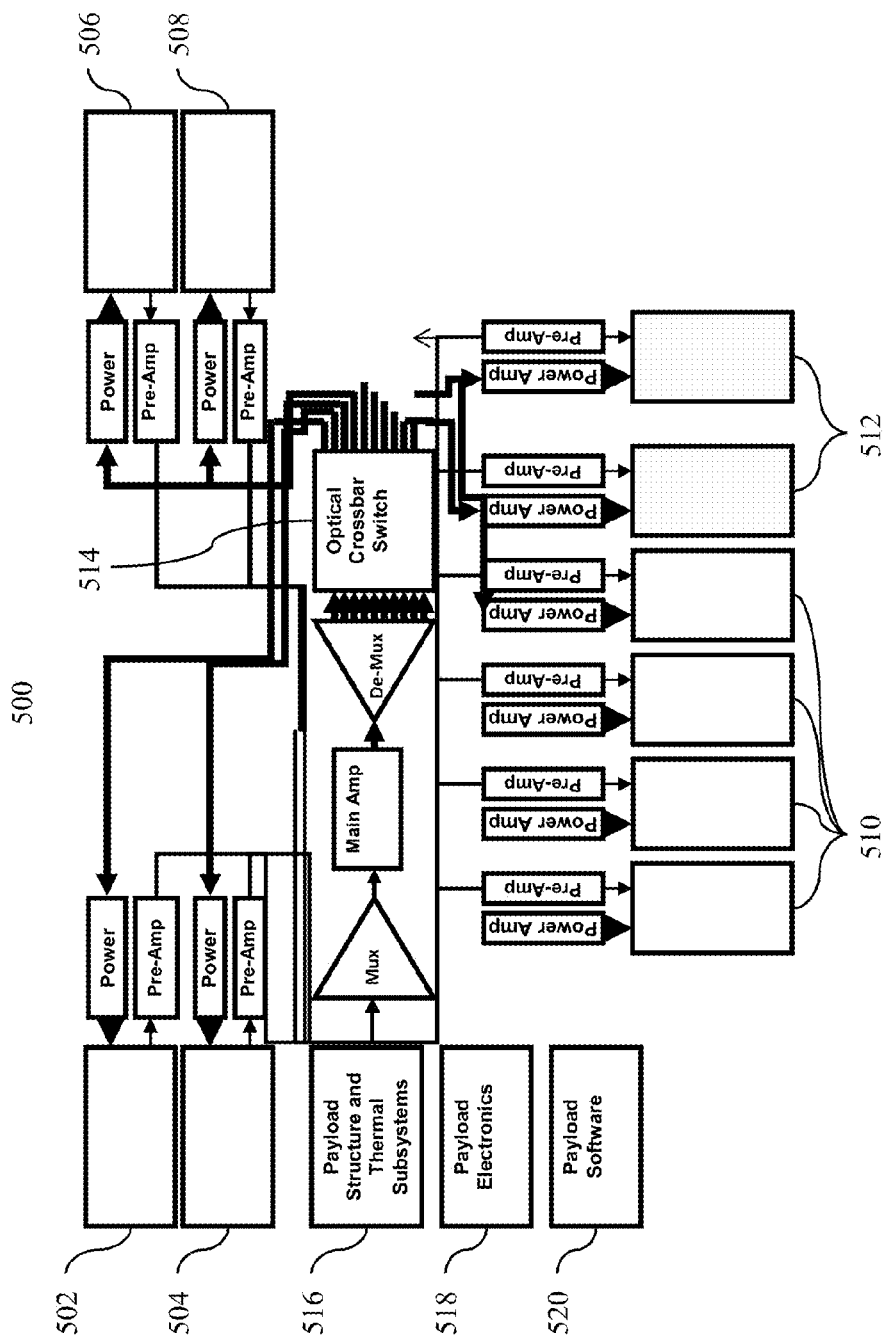
FIG. 5 is an exemplary block diagram for an on-board optical hardware system, according to some embodiments of the present invention.

FIG. 5 is an exemplary block diagram for an on-board optical hardware system 500, according to some embodiments of the present invention. Here, a beam expander 502 is used for inter-satellite communications with a nearest neighboring satellite and a beam expander 504 is used for inter-satellite communications with next nearest neighboring satellite, down stream. Similarly, a beam expander 506 is used for inter-satellite communications with a nearest neighboring satellite and a beam expander 508 is used for inter-satellite communications with next nearest neighboring satellite, up stream. In some embodiments, the beam expanders 502, 504, 506 and 508 are each a 30-cm ISL beam expander with multi-positional mounting with FSM. In some embodiments, the ISL beam expanders used for the nearest neighbor connections (502 and 506) are half that size, that is, 15 cm. Additionally, four beam expanders 510 are used for ground communications with two or more optional additional beam expanders 512 for redundancy purposes. As shown, each beam expander is associated with a power amplifier and a pre-amplifier.

The functions of the Mux, Main Amplifier, De-Mux and the optical crossbar switch 514 are similar to those described with respect to FIG. 4. Each of the amplifiers may include one or more optical filters to reduce signal noise. In some embodiments, the on-board optical hardware includes payload structure and thermal sub-systems 516, payload electronics 518 and payload software 520. These are payload functions, with the payload structure providing structural support and the thermal sub-system providing temperature control. The payload electronics accepts network switching commands and controls the configuration of the optical crossbar switch, and the payload software interprets command strings and translates them into the proper switch instructions. As shown, the optical amplification is distributed with a plurality of high gain pre-amplifiers, one or more main amplifiers, and a plurality of power amplifiers. In some embodiments, some reshaping of the pulses may be added to the payload hardware, but Error Detection and Correction (EDAC) and Doppler correction are deferred until the signal reaches its ground destination.

Figure 6:
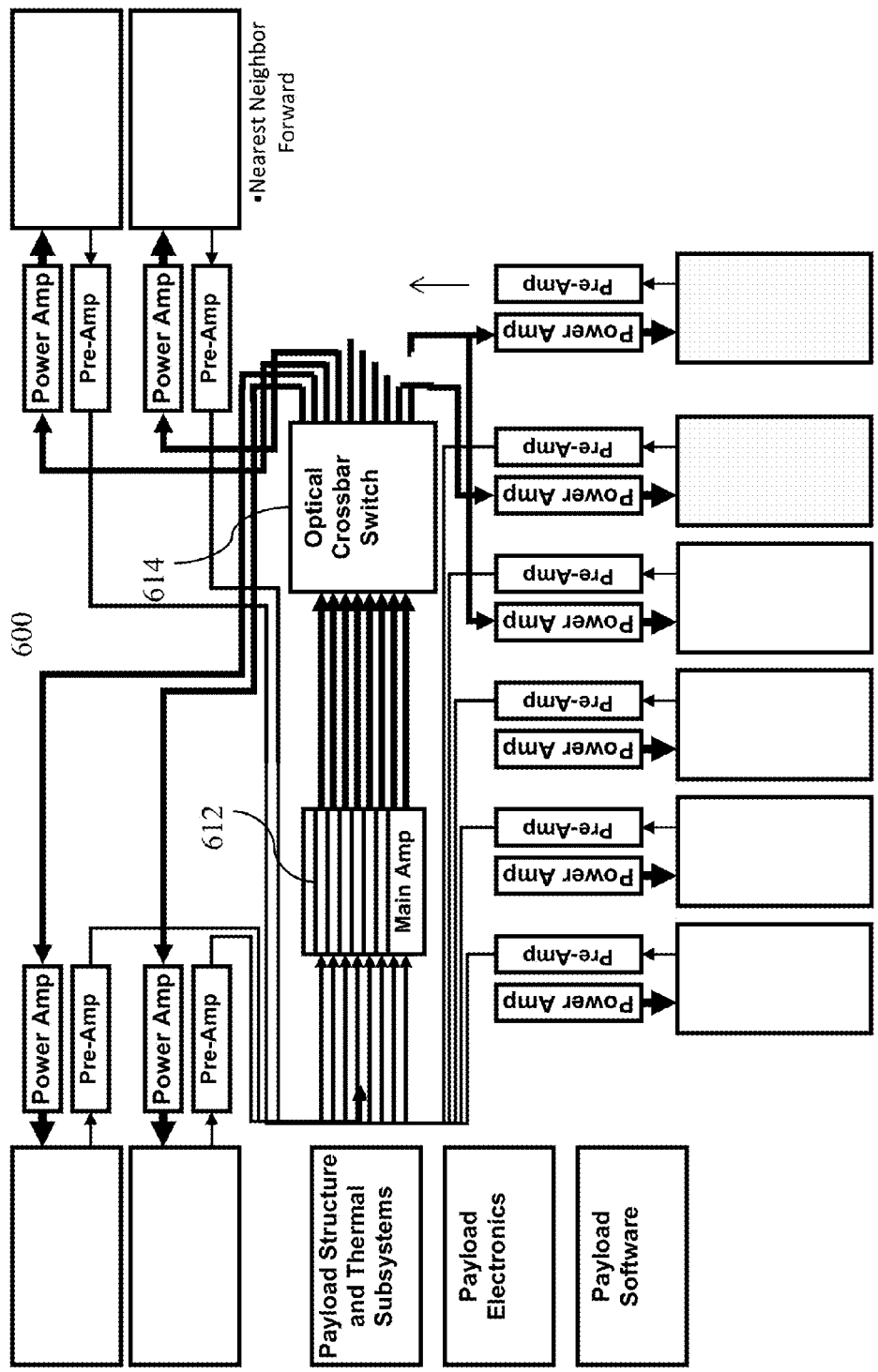
FIG. 6 is an exemplary block diagram for an on-board optical hardware system, according to some embodiments of the present invention.

FIG. 6 is an exemplary block diagram for an on-board optical hardware system 600, according to some embodiments of the present invention. In these more simplified embodiments, there is no multiplexer or de-multiplexer to separate individual channels from channel bundles. Accordingly, processing (amplification and switching) is performed on each channel bundle, rather than each individual channel. The beam expanders, preamplifiers and power amplifiers are similar to those depicted in and described with respect to FIG. 5. In these embodiments, there are separate main amplifiers for each connection being relayed through the satellite, so the main amplifiers can be designed with lower power requirements and a reduced heat load per amplifier. The optical crossbar switch may be similar to the N×N version shown in FIG. 5.

The implementation of an all-optical relay in space reduces the size, weight, and power of the payload. The optical switches in space, with varying levels of switching complexity, allow fully transparent or fully flexible worldwide network connectivity. The use of multiple inter-satellite link telescopes adds network redundancy, while the addition of an elevation adjust mechanism to these telescopes allows new satellites to be added at any time and failed satellites to be removed from the network. The use of multiple up/down link telescopes allows each satellite to support multiple ground sites within its moving area of responsibility, while the use of dual line-of-sight control loops within each telescope's field of view adds local area site diversity to reduce the impact of clouds. That is, each up/down link telescope can simultaneously track two local area sites, and use whichever one has the clearer line of sight.

Furthermore, the on-board optical hardware of the present invention provides transparent relay of the incoming bit stream and accommodates evolution and revisions in standards over the operational life of the host satellites, because the optical bent pipe is independent of any standards and therefore any changes in the standard is accommodated by the changes in the ground hardware.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A free space optical communication system comprising:
a constellation of a plurality of satellites, each of the plurality of satellites comprising:
a plurality of inter-satellite optical telescopes for optical communication with multiple neighboring satellites, and wherein each inter-satellite optical telescope is capable of adjusting its elevation angle to accommodate changes in the number of satellites in the constellation, and
a plurality of up/down link optical telescopes for optical communication with multiple ground sites, each ground site having two or more ground optical telescopes,
wherein as the satellite constellation passes a given ground site, one or more of the up/down-link telescopes of a given satellite are configured to track at least two ground optical telescopes of the given ground site, determine a line of site for each of the at least two ground optical telescopes of the given ground site, and send data to a ground optical telescope with the clearest line of sight to the given satellite.

2. The system of claim 1, wherein each inter-satellite optical telescope utilizes circular polarization or spectral diversity to provide dual optical signal paths.

3. The system of claim 1, wherein said one or more of the up/down-link telescopes of a given satellite are configured to continuously and in real time track at least two respective ground optical telescopes of the given ground site.

4. The system of claim 1, wherein said one or more of the up/down-link telescopes of a given satellite are configured to track at least two respective ground optical telescopes of the given ground site, using an optical beacon.

5. The system of claim 1, wherein a single up/down-link telescope of the given satellite is configured to track said at least two respective ground optical telescopes of the given ground site using circular polarization or spectral diversity.

6. The system of claim 1, wherein four inter-satellite optical telescopes are used for optical communication with two nearest neighboring satellites, one of each side, and two next nearest neighboring satellites, one on each side, respectively.

7. The system of claim 6, wherein each optical telescope used for nearest neighboring satellite includes an aperture of about 15 cm in diameter, and each optical telescope used for next nearest neighboring satellite includes an aperture of about 30 cm in diameter.

8. The system of claim 1, wherein each inter-satellite telescope includes an aperture of about 30 cm in diameter.

9. The system of claim 1, wherein the constellation of the plurality of satellites is launched into a common Medium Earth Orbit (MEO) equatorial orbit plane.

10. The system of claim 1, wherein the constellation of the plurality of satellites includes a plurality of Medium Earth Orbit (MEO) satellites and one or more Geostationary Earth Orbit (GEO) satellites.

11. The system of claim 10, wherein each of the plurality of MEO satellites includes one or more GEO-link telescopes with a field of regard sufficiency large such that at least one MEO satellite is always able to communicate with any of the GEO satellites.

12. The system of claim 1, wherein the constellation of the plurality of satellites includes a plurality of Medium Earth Orbit (MEO) satellites and one or more Low Earth Orbit (LEO) satellites.

13. The system of claim 1, wherein each inter-satellite optical telescope includes beam steering mirrors to compensate for jitter and orbit differences of said each inter-satellite optical telescope.

14. The system of claim 1, wherein each up/down link optical telescope includes dual internal steering mirrors to maintain track on said at least two respective ground optical telescopes of the given ground site.

15. The system of claim 1, wherein each up/down link optical telescope is configured to utilize Dense Wavelength Diversity Multiplexing (DWDM) to provide bi-directional links with at least 100 Gbps bandwidth with each ground site.

16. The system of claim 1, wherein each up/down link telescope includes an aperture of about 10 cm in diameter.

17. The system of claim 1, wherein the plurality of up/down link optical telescopes are gimbaled telescopes or telescopes with coelostats on each satellite to track a ground site.

18. The system of claim 1, wherein each of the plurality of satellites further includes one or more main lasers for amplifying the outgoing optical signals.

19. The system of claim 1, wherein each of the plurality of satellites includes multiple amplifier chains capable of reamplifying the incoming optical signal.

20. The system of claim 1, wherein at least one of the plurality of up/down optical telescope is available for optical communication with a ground site when an optical ground connection from a preceding satellite in the constellation is nearing an end, to establish a new connection to a following satellite in the constellation before breaking the optical ground connection from the preceding satellite.

21. A method for free space optical communication in a constellation of a plurality of satellites, the method comprising:
using a plurality of inter-satellite optical telescopes in each of the plurality of satellites to optically communicate with multiple neighboring satellites;
using a plurality of up/down link optical telescopes in each of the plurality of satellites to optically communicate with multiple ground sites, each ground site having two or more ground optical telescopes;
tracking, by a given satellite, at least two ground optical telescopes of a given ground site;
determining a line of site for each of the at least two ground optical telescopes of the given ground site; and
sending data to a ground optical telescope with the clearest line of sight to the given satellite, wherein each of the plurality of satellites optically processes and switches incoming and outgoing optical signals, without converting the optical signals into electrical signals.

22. The method of claim 21, further comprising utilizing circular polarization or spectral diversity to provide dual optical signal paths, by each inter-satellite optical telescope.

23. The method of claim 21, further comprising continuously and in real time tracking at least two respective ground optical telescopes of the given ground site, by one or more of the up/down-link telescopes of the given satellite.

24. The method of claim 21, further comprising using four inter-satellite optical telescopes to optically communicate with two nearest neighboring satellites, one of each side, and two next nearest neighboring satellites, one on each side, respectively.

25. The method of claim 21, wherein the constellation of the plurality of satellites is launched into a common Medium Earth Orbit (MEO) equatorial orbit plane.

26. The method of claim 21, wherein the constellation of the plurality of satellites includes a plurality of Medium Earth Orbit (MEO) satellites, and one or more Geostationary Earth Orbit (GEO) satellites or Low Earth Orbit (LEO) satellites.

27. The method of claim 21, further comprising making available at least one of the plurality of up/down optical telescope for optical communication with a ground site when an optical ground connection from a preceding satellite in the constellation is nearing an end, to establish a new connection to a following satellite in the constellation before breaking the optical ground connection from the preceding satellite.

* * * * *